United States Patent
Guetlhuber

(10) Patent No.: US 6,932,950 B1
(45) Date of Patent: Aug. 23, 2005

(54) TUBULAR REACTOR FOR CATALYTIC GAS PHASE REACTIONS

(75) Inventor: Friedrich Guetlhuber, Metten (DE)

(73) Assignee: Man DWE GmbH, Deggendorf (DE)

( * ) Notice: Subject to any disclaimer, the term of this patent is extended or adjusted under 35 U.S.C. 154(b) by 0 days.

(21) Appl. No.: 09/622,301

(22) PCT Filed: Feb. 17, 1999

(86) PCT No.: PCT/EP99/01036

§ 371 (c)(1),
(2), (4) Date: Oct. 25, 2000

(87) PCT Pub. No.: WO99/42208

PCT Pub. Date: Aug. 26, 1999

(30) Foreign Application Priority Data

Feb. 18, 1998 (DE) ................................ 198 06 810

(51) Int. Cl.[7] ............................... B01J 8/00; B01J 8/06; F28D 21/00
(52) U.S. Cl. ...................... 422/202; 422/188; 422/196; 422/197; 422/198; 422/201; 422/202; 422/205
(58) Field of Search ................................ 422/188, 196, 422/197, 198, 202, 205, 240, 311, 312, 201

(56) References Cited

U.S. PATENT DOCUMENTS

| | | | |
|---|---|---|---|
| 2,986,454 A | 5/1961 | Jewett | 23/288 |
| 3,929,421 A | 12/1975 | Werges | 23/288 |
| 4,127,389 A | 11/1978 | Hackemesser et al. | 422/201 |
| 5,048,601 A * | 9/1991 | Yamaguchi et al. | 165/140 |
| 5,820,655 A * | 10/1998 | Gottzmann et al. | 95/54 |

FOREIGN PATENT DOCUMENTS

| | | |
|---|---|---|
| DE | 2201528 | 11/1972 |
| GB | 776416 | 7/1955 |

* cited by examiner

*Primary Examiner*—Alexa Doroshenk
(74) *Attorney, Agent, or Firm*—Milde & Hoffberg, LLP

(57) ABSTRACT

A tubular reactor (2) for catalytic reactions with a heat carrier that inside a reactor jacket (10) circulates around a contact tube bundle (8), which extends between a tube plate (4; 6; 80; 82) at the reaction gas inlet side and one at the reaction gas outlet side with gas inlet and gas outlet hoods (12, 14) spanning the face sides of the two tube plates and containing reaction-inhibiting media in the zone of the tube plate on the gas inlet side, characterize themselves in that the reaction-inhibiting media consist entirely or in part of a heat insulation layer (46; 50; 64; 80) with openings for the tube cross-sections on at least one of the two sides of the respective tube plate (4; 60; 82). In this manner, either the respective tube plate (4; 60; 82) is insulated against the hot heat carrier or the reaction gas entering into the reactor is prevented from having contact with the comparatively hot tube plate in order to prevent harmful secondary reactions at the reactor inlet.

10 Claims, 5 Drawing Sheets

TUBULAR REACTOR FOR CATALYTIC GAS PHASE REACTIONS

BACKGROUND OF THE INVENTION

The invention relates to a tubular reactor for catalytic gas phase reactions.

Usually, such reactors exhibit a reactor jacket containing a heat carrier that circulates around a contact tube bundle, which extends between a tube plate at the gas inlet side and a tube plate at the gas outlet side, as well as gas inlet and gas outlet hoods spanning the face sides of the two tube plates. The process gas, usually a gas mixture, that is to be brought to reaction enters a contact tube that contains a catalytic mass via the gas inlet hood and after passing said contact tube exits the reactor via the gas outlet hood. The gas inlet may be located either on the top or bottom side, and as a whole the heat carrier may pass through the reactor in parallel flow or counter flow with regard to the process gas flow. The reactor can also have a multi-step design as shown, for example, in the German Patent No. DE 22 01 528 C, FIG. 5.

Usually, the process gas stream is comprised of two or more material streams that are combined shortly before entering the reactor, that is, its gas inlet hood. In this course, secondary reactions that are harmful to the process or even ignition and deflagration may occur, especially in the immediate area surrounding the generally relatively hot tube plate. Examples of such reaction processes are the production of maleic acid anhydride, phthalic acid anhydride, acrolein and acrylic acid.

Fillers of ceramic materials or a wire mat mesh have been introduced into the gas inlet hood in an effort to prevent such secondary reactions. Other attempts involved insulating the tube endings by using cylinders, because the highest temperatures occur generally at the tube plate on the gas inlet side in the area of the tube ending. However, in the end, none of these measures proved effective or at least dependable for preventing the above mentioned secondary reactions.

The U.S. Pat. No. 2,986,454 A discloses the use of so-called isolation tubes in series prior to the contact tube ends on the reaction gas inlet side, where said isolation tubes are surrounded by a cooling chamber with circulating air. With this arrangement, the entering reaction gas mixture is kept away from hot parts prior to the start of the intended reaction. Although the isolation tubes are connected in series to the following contact tubes in a sealed manner, the air that passes through the cooling chamber is subsequently added to the process gas. It is understood that such a process is limited to certain applications. In addition, the isolation tubes which extend in a pivotal manner into the contact tubes for the purpose of compensating for differing heat expansions form undesirable contractions for adding and removing the catalyst. This applies in particular to reactors with numerous contact tubes, for example, more than 10,000, and a large diameter, for example, 7000 mm, where temperature-related offsets of about 10 mm in the edge zone can be expected.

Furthermore, it is known from the U.K. Patent No. 776 416 A to provide a poured and thereafter hardened heat insulation layer at the tube plates on the side of the heat carrier to avoid crystallization in a tubular heat exchanger for cooling or heating of saturated solutions, where said heat exchanger also exhibits a heat carrier that circulates around a tube bundle that stretches between two tube plates. However, such materials, such as artificial resin that must be sufficiently fluid during pouring to distribute itself around the tubes in a desired manner exhibit only a limited temperature resistance that makes them unsuitable for the application of molten salts, for example, as a heat carrier.

Finally, it is known from the U.S. Pat. No. 4,127,389, to design the gas inlet and gas outlet hoods together with the associated tube plates as individual chambers within the reactor housing where said chambers are essentially surrounded on all sides by stream-calmed heat carriers. For this purpose, an unsealed plate penetrated by the contact tubes is located at a distance and parallel to each tube plate, where the one on the gas inlet side carries an insulation layer made of cast refractory material. This is a relatively narrow endothermic high-temperature reactor, whose heat carrier may exhibit a temperature of between 1075 and 870 1° C. and is, therefore, definitely in a gaseous state. Furthermore, the pressure difference between process gas and the heat carrier may be just about 7 bar at the most. Accordingly, the tube plates together with their suspensions can be made relatively light in weight. If they had to carry the liquid heat carrier in addition to the weight of the tubes, then the usual immediate anchoring at the reactor jacket would be unavoidable. This applies particularly for reactor designs with a comparatively great diameter and many tubes.

SUMMARY OF THE INVENTION

Consequently, it is an objective of the present invention to provide a tubular reactor of the type described above—that is, with a heat insulation zone that borders on the heat carrier side of the tube plate on the gas inlet side—such that it can be operated with essentially any common diameter, any common number of tubes, any common pressure difference and any conceivable heat carrier including, for example, a salt bath.

This objective, as well as other objectives which will become apparent from the discussion that follows, are achieved, in accordance with the present invention, by an improvement wherein the two tube plates are anchored in an essentially known manner at their edges to the reactor jacket in a sealed manner and wherein the heat insulation zone includes a chamber containing a solid, liquid or gaseous heat insulation material or components that are stream-calming with respect to the heat carrier.

The respective heat insulation zone at the tube plate on the gas inlet side in the shape of a chamber or formed by stream-calming structures has the effect that the gas plate on the inlet side of the reaction gas and the surrounding area of the gas inlet hood is kept comparatively cool, without the need for any limitations in the process, the reactor design or the heat exchanger material to be used. Through a respective design of the heat insulation zone, the temperature gradient may be kept low regardless of the comparatively cold tube plate that connects to the reactor jacket as is desirable for keeping the temperature stress low.

For a full understanding of the present invention, reference should now be made to the following detailed description of the preferred embodiments of the invention as illustrated in the accompanying drawings.

DESCRIPTION OF THE PREFERRED EMBODIMENTS

Figure 1:
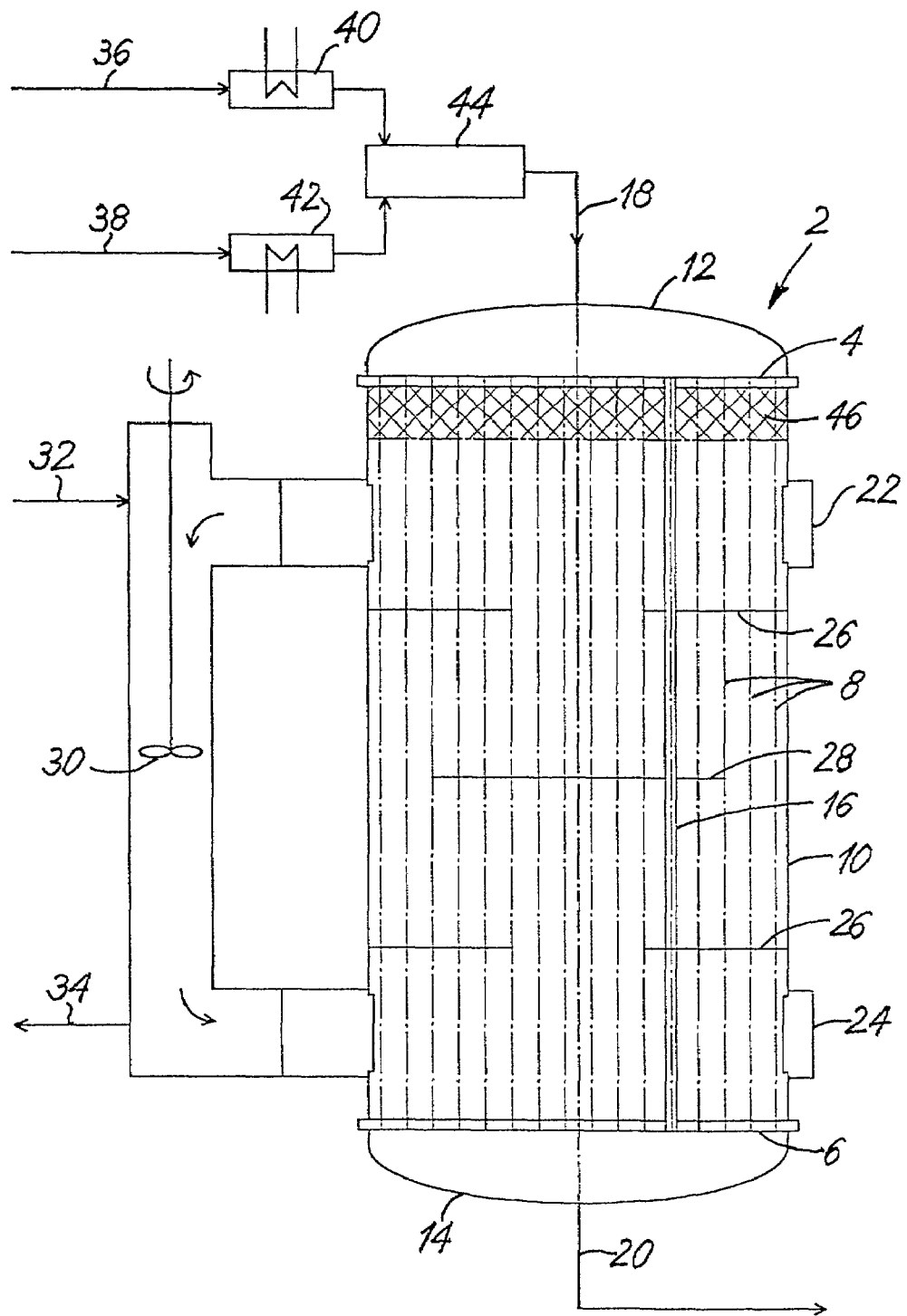
FIG. 1 shows schematically a longitudinal section through a tubular reactor according to the invention in a first embodiment together with connecting elements.

The present invention will now be described with reference to FIGS. 1–8 of the drawings. Identical elements in the various figures are identified by the same reference numerals.

Easily comparable elements that occur in the individual Figures were given the same reference number.

The tubular reactor 2 shown in FIG. 1 includes in typical manner a vertical tube bundle 8 that stretches inside a cylindrical reactor jacket 10 from a tube plate 4 at the gas inlet side to a tube plate 6 at the gas outlet side with the two tube plates 4 and 6 being attached to said cylindrical jacket in a sealed manner. The tube plate 4 at the gas inlet side is spanned by a gas inlet hood 12 and the tube plate 6 at the gas outlet side is spanned by a gas outlet hood 14, with both hoods being attached to the respective tube plate in a sealed manner. The individual tubes, e.g., 16, of the tube bundle 8 contain a gas-permeable catalytic mass. The reaction or process gas that is to be brought to a reaction is fed into the gas inlet hood 12 via a gas supply line 18, while the process gas that has passed through the tube bundle 8 and that has gone through the reaction process is removed from the gas outlet hood 14 via a gas removal line 20. Ring channels 22 and 24 surrounding the reactor jacket 10 close to the two tube plates 4 and 6 make possible the supply and removal of a heat carrier, which is in a liquid state at least when the reactor is in operation, into or from the reactor jacket 10, where said heat carrier circulates around the individual tubes, e.g., 16, of the tube bundle 8 to remove the reaction heat. The flow of the heat carrier can be directed in a desired manner or, if required, distributed across the cross section of the reactor jacket as shown by using two types of guide plates 26 and 28. The heat carrier that is removed from the reactor jacket 10 via the ring channel 22 is returned to the reactor jacket 10 via the ring channel 24 by using a pump 30 whereby a controllable partial flow is guided through a cooling device (not shown here) via branch lines 32 and 34.

The process gas supplied to the reactor via the gas supply line 18 is (in this example) comprised of two partial streams 36 and 38 that are preheated using the heat exchangers 40 and 42, mixed in a mixing device 44 and then supplied to the gas inlet hood 12 via the gas supply line 18 as the aforementioned process gas.

In some cases, the supplied process gas is by itself already very reactive, especially if it has had contact with hot surfaces, with the tube plate 4 generally being the hottest surface within the space under the gas inlet hood 12. For this reason, the invention provides a heat insulation zone 46 on the heat carrier side for the tube plate 4 against the heat carrier that circulates around the tube bundle 8 and in this manner to keep the tube plate comparatively cool together with the neighboring parts of the gas inlet hood 12.

Figure 2:
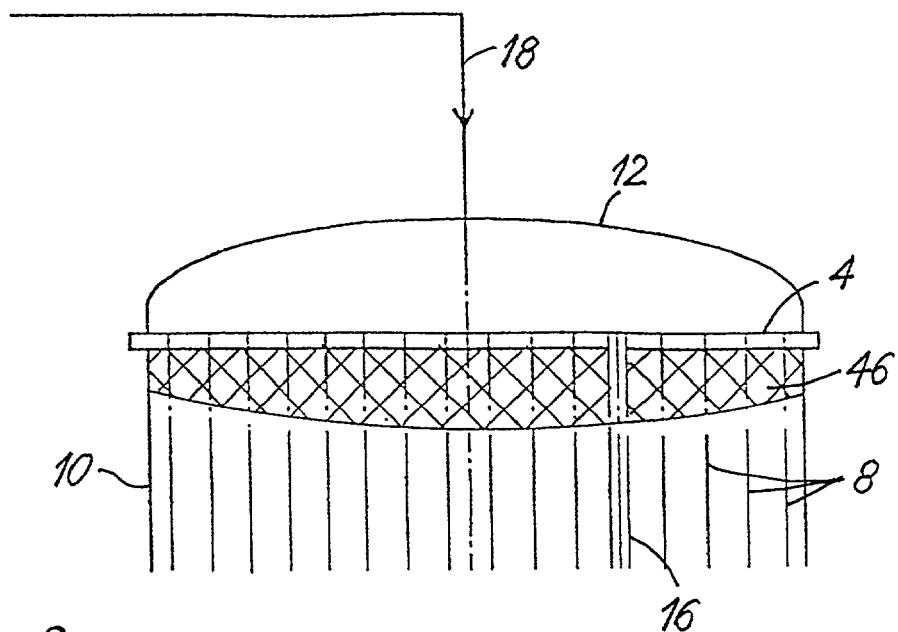
FIG. 2 shows schematically a longitudinal section through an end section at the gas inlet side of such a tubular reactor, in a variation of the embodiment of FIG. 1.
Figure 3:
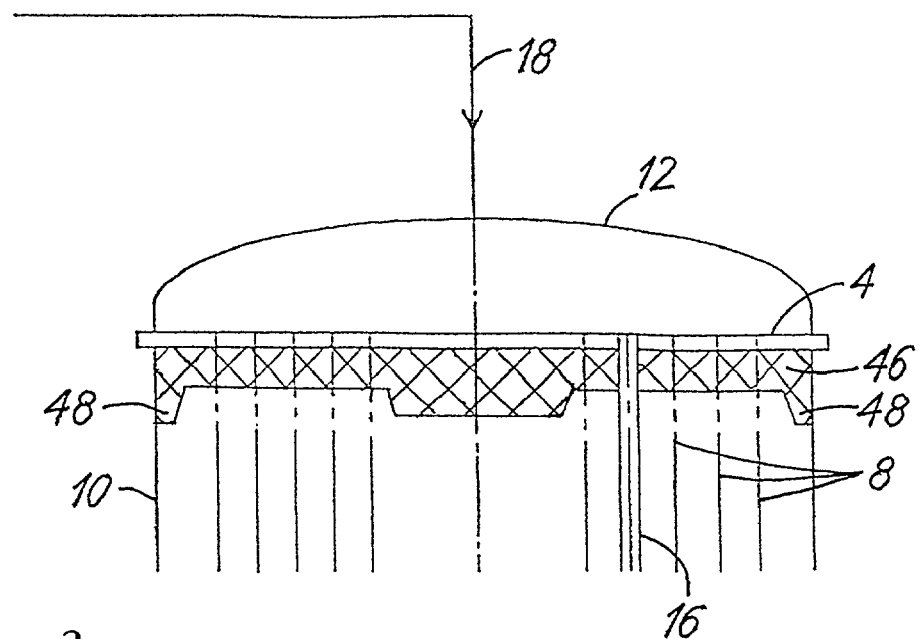
FIG. 3 shows schematically a longitudinal section through an end section at the gas inlet side of a tubular reactor as in FIG. 1, in a different variation of the embodiment of FIG. 1.

In FIGS. 1, 2 and 3, the heat insulation layer 46 is shown only schematically. While it has a constant thickness according to FIG. 1, the thickness increases toward the center according to FIG. 2 under the assumption that the tube plate usually has the highest temperature in that area.

It is understood that for other temperature distributions, the profile of the heat insulation layer 46 may have a different shape. Thus, the heat insulation layer 46 can, for example, as shown in FIG. 3, include a collar 48 at the edge of the tube plate 4 along the interior wall of the reactor jacket 10 in order to keep the temperature gradient at the connection of the reactor jacket to the cooler tube plate, and thus the temperature stress, low. As can be seen from FIG. 3 as well, the thickness of the heat insulation layer 46 can also be different—generally greater—in the tube-free zones of the reactor than in the tube zones in order to accommodate for the normally greater heat of the tube plate in these zones. It is furthermore conceivable to vary the structure of the heat insulation zone instead of the thickness, or vary the thickness of the heat insulation zone alone. Furthermore, the heat insulation layer 46 can be limited to partial areas of the tube plate 4—for example, the tube-free zone or the edge area of the tube plate at the transition to the reactor jacket 10.

Figure 4:
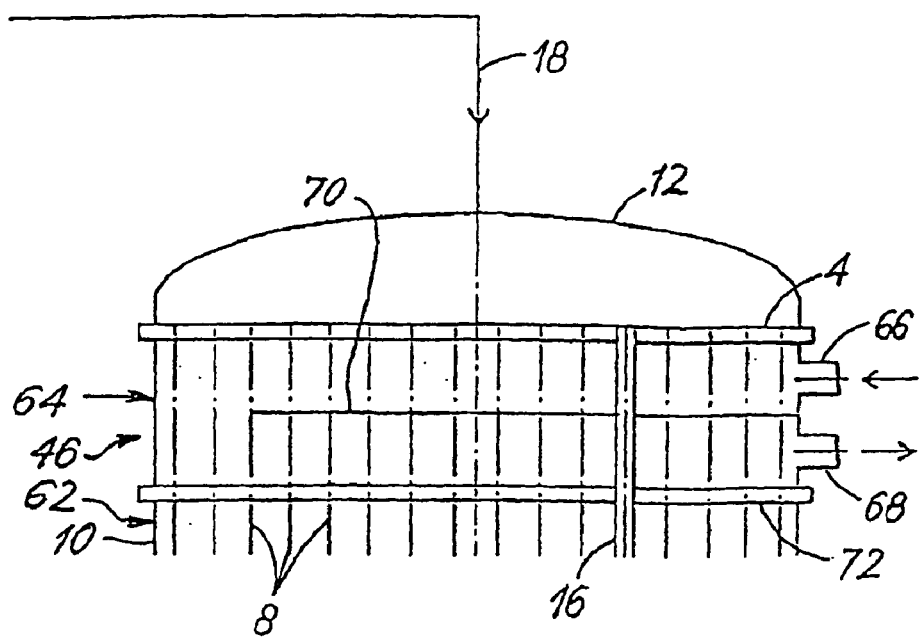
FIG. 4 shows schematically a longitudinal section through an end section at the gas inlet side of a tubular reactor according to the invention in a specific embodiment.

FIG. 4 shows a practical embodiment of the heat insulation zone 46 as is shown only schematically in FIG. 1. Here, the heat insulation zone 46 consists of a chamber 64 that is closed against the reaction zone 62 of the reactor. The chamber 64 exhibits inlets and outlets 66 and 68 one above the other for a cooling medium as well as a guide plate 70 between the inlet and outlet, that forces the cooling medium to flow along the tube plate 4, as well as the separator disk 72 that separates the chamber 64 from the reaction zone 62. The pipes, such as 16, for example, penetrate the separator disk 72 in a sealed manner.

The respective cooling medium can be made of the same or a different medium as the heat carrier in the reaction zone 62. In the first case, it may be diverted at a suitable location after its re-cooling from the heat carrier circulation according to FIG. 1. Also, possible small leakages at the tube penetrations through the separator disk 72 are not crucial in this case. Still, with regard to the reaction zone 62, about the same pressure should be maintained in the chamber 64 in order to keep leakage streams at the tube penetrations to a minimum.

The chamber 64 can also be evacuated or filled with an immovable solid, liquid or gaseous heat insulation medium, such as sand, oil or air, for example. In this regard, a liquid or gaseous heat insulation medium can be prevented from circulating through an installed cell structure. In any case, the cooling or heat insulation medium used in the chamber 64 should be one that is incapable of reacting with the heat carrier used in the reaction chamber 62.

Figure 5:
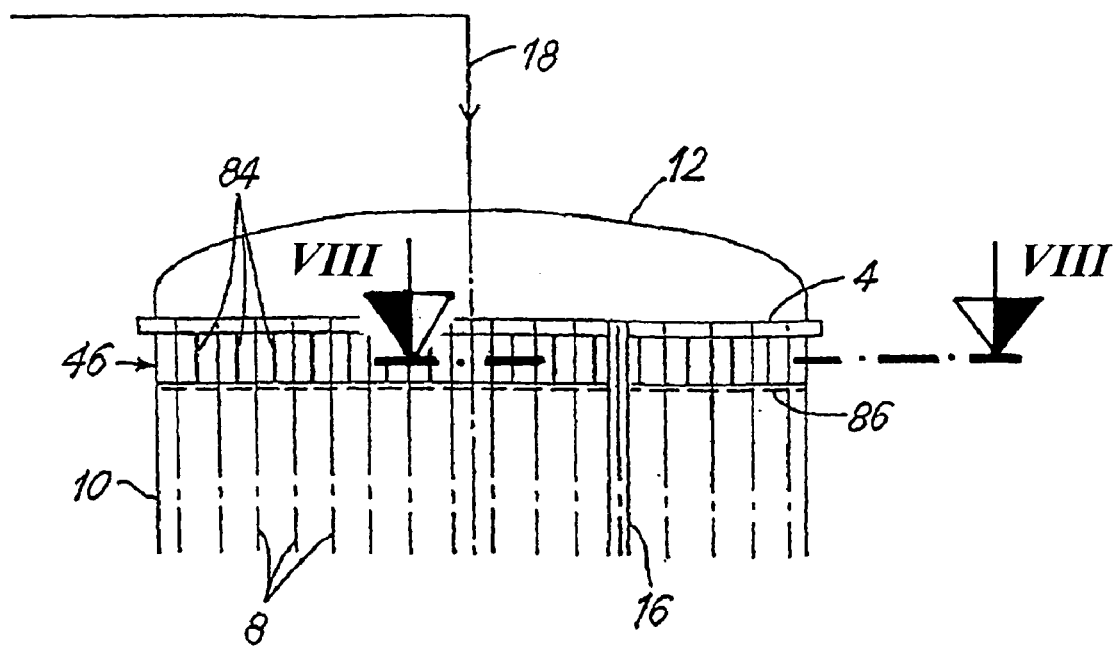
FIG. 5 shows schematically a longitudinal section through an end section at the gas inlet side of a tubular reactor according to the invention in another specific embodiment.

According to FIG. 5, the heat insulation layer 46 simply consists of a stream-calming zone of the heat carrier that is the result of built-in components 84 in the shape of honeycombs or concentric ring structures, where the heat carrier will assume a lower temperature than in the actual reaction zone due to the fact that the tube plate 4 is cooled by the incoming process gas, regardless whether the reactor operates in parallel or counter flow mode. This applies even more when the contact tubes are not filled with catalyst all the way to the tube plate.

The components 84 can, but do not necessarily have to be covered by a plate 86, as indicated in FIG. 5 by a dashed line, and can also be sealed towards the tube plate 4.

Figure 8A:
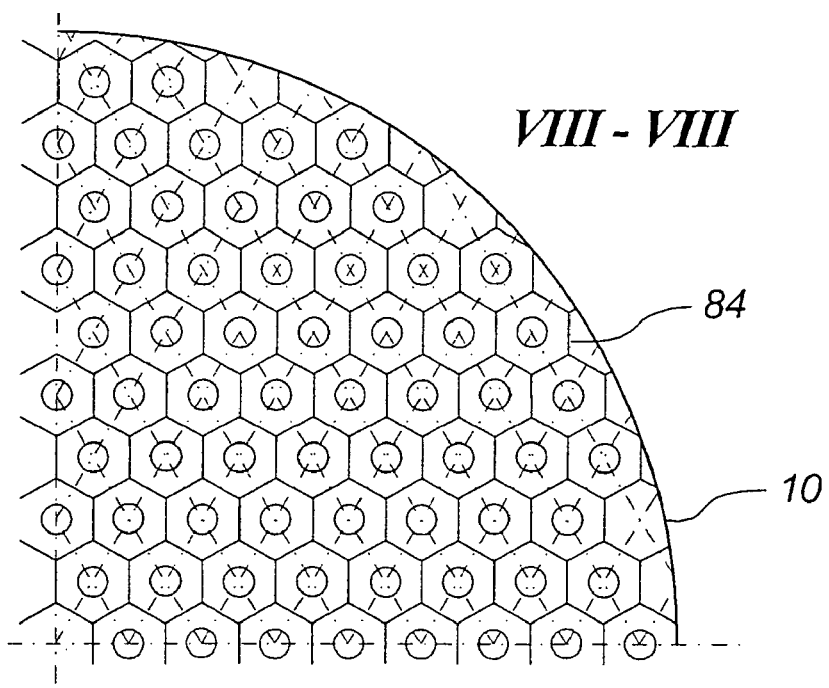
FIG. 8a is a possible cross-sectional view of the tubular reactor, taken along the line VIII—VIII in FIG. 5, showing a honeycomb configuration.
Figure 8B:
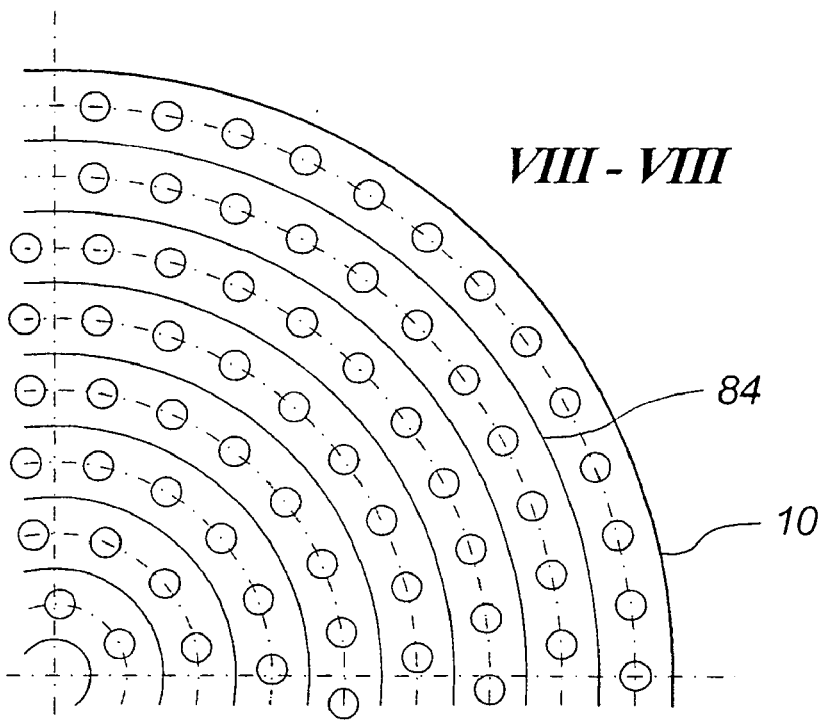
FIG. 8b is a possible cross-sectional view of the tubular reactor, taken along the line VIII—VIII in FIG. 5, showing a concentric ring structure.

The components 84 in the shape of honeycombs are illustrated in FIG. 8a; whereas the components 84 in the shape of concentric ring structures are illustrated in FIG. 8b.

Figure 6:
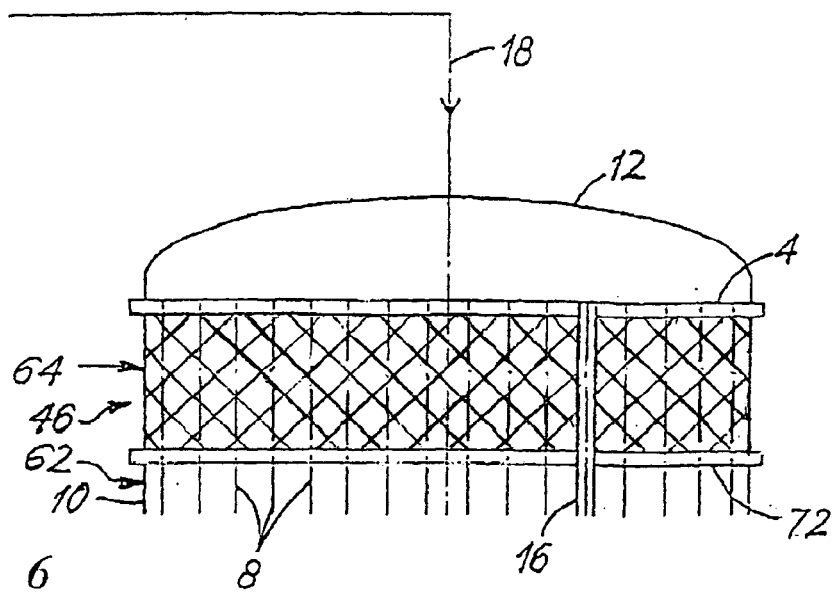
FIG. 6 shows schematically a longitudinal section through an end section at the gas inlet side of a tubular reactor according to the invention in still another specific embodiment.

FIG. 6 shows still another embodiment of the tubular reactor according to the invention having a heat insulation zone in the form of a chamber in the gas inlet side of the reactor. The gaseous or liquid heat insulation material in this chamber is prevented from circulating by means of structures installed in the chamber.

Figure 7:
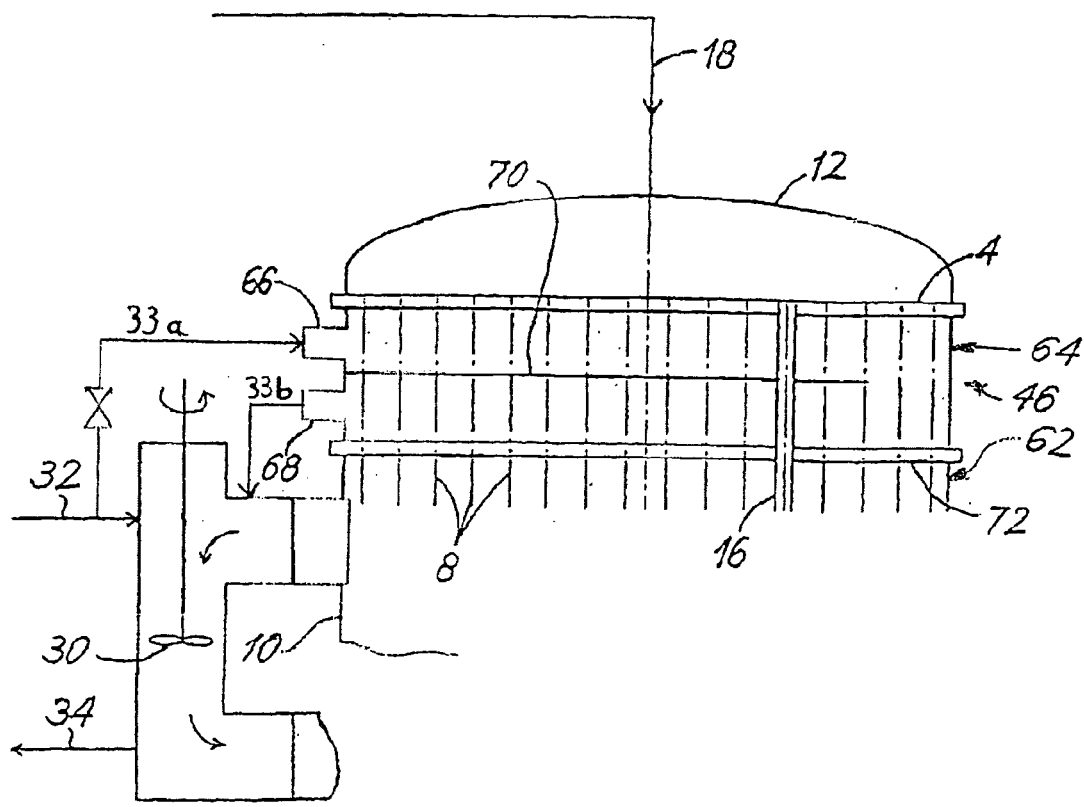
FIG. 7 shows schematically a longitudinal section through an end section at the gas inlet side of a tubular reactor according to the invention in still another specific embodiment.

Finally, FIG. 7 shows still another tubular reactor of the type illustrated in FIG. 4 in which a partial stream of the heat carrier 32, 34 circulating around the contact tube bundle is bled off through lines 33a and 33b and used as the liquid or gaseous heat insulation material.

Basically, the present invention can be applied to exothermally as well as endothermically operating reactors or multi-step reactors, such as the one shown in FIG. 5 of the German Patent No. DE 22 01 528 C, regardless whether the gas inlet is on the top or bottom side and the heat carrier passes through the reactor in a parallel flow or counter flow mode.

It generally applies that the tube ends at the tube plate on the gas inlet side can be entirely or in part kept free of catalytic mass or can be filled with an inert material or a mixture of such a catalytic material in order to limit the reaction temperature close to the tube plate.

There has thus been shown and described a novel tubular reactor for catalytic gas phase reactions which fulfills all the objects and advantages sought therefor. Many changes, modifications, variations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention, which is to be limited only by the claims which follow.

What is claimed is:

1. A tubular reactor for catalytic gas phase reactions comprising, in combination:
   (a) a heat carrier circulating in a reaction zone around a contact tube bundle inside a reactor jacket, the tube bundle consisting of single piece tubes extending through a first tube plate at the reaction gas inlet side and a second tube plate at the reaction gas outlet side, beginning and ending at the first and second tube plates, respectively, and being sealed with respect to these tube plates, the two tube plates being anchored in an essentially known manner at their edges to the reactor jacket and being sealed with respect to the reactor jacket;
   (b) gas inlet and gas outlet hoods spanning the face sides of the first and second tube plates, respectively, the first tube plate having a reaction gas side in contact with the reaction gas and a heat carrier side; and
   (c) a heat insulation zone that borders on the heat carrier side of the first tube plate and that includes at least one of (1) a chamber containing at least one of a solid and liquid heat insulation material and being separated from the reaction zone by a separator plate which is penetrated by the tubes, the tube penetrations allowing for leakages, and (2) built-in components that are stream-calming with respect to the heat carrier.

2. Tubular reactor as set forth in claim 1, wherein the heat insulation zone exhibits a locally varying thickness.

3. Tubular reactor as set forth in claim 1, wherein the heat insulation zone exhibits a locally varying structure.

4. Tubular reactor as set forth in claim 1, wherein the heat insulation zone is limited to partial tube-free areas of the tube plate on the reaction gas inlet side.

5. Tubular reactor as set forth in claim 1, having a heat insulation zone in the form of a chamber, the improvement wherein a liquid heat insulation material in said chamber is prevented from circulating by structures installed in said chamber.

6. Tubular reactor as set forth in claim 1, having a heat insulation zone in the form of a chamber, the improvement wherein a liquid or gaseous heat insulation material is circulated through said chamber as cooling medium.

7. Tubular reactor as set forth in claim 6, wherein a partial stream of the heat carrier circulating around the contact tube bundle is used as said liquid heat insulation material.

8. Tubular reactor as set forth in claim 1, having a heat insulation zone formed by built-in components, the improvement wherein said components exhibit at least one of a honeycomb and concentric ring structure.

9. Tubular reactor as set forth in claim 8, wherein said components are covered, at least on the side opposite the tube plate on the reaction gas inlet side.

10. Tubular reactor as set forth in claim 1, wherein the heat insulation zone is limited to the edge area of the tube plate on the reaction gas inlet side.

\* \* \* \* \*